J. C. RAMSEY.
Sheep Rack.

No. 68,111.  Patented Aug. 27, 1867.

WITNESSES:
INVENTOR:

United States Patent Office.

J. C. RAMSEY, OF LE ROY, OHIO, ASSIGNOR TO HIMSELF AND S. M. ENGLAND, OF THE SAME PLACE.

Letters Patent No. 68,111, dated August 27, 1867.

IMPROVEMENT IN FEEDING-RACKS FOR STOCK.

*The Schedule referred to in these Letters Patent and making part of the same.*

TO ALL WHOM IT MAY CONCERN:

Be it known that I, J. C. RAMSEY, of Le Roy, in the county of Medina, and State of Ohio, have invented certain new and useful Improvements in Sheep-Feeding Racks, &c.; and I do hereby declare that the following is a full and complete description of the same, reference being had to the accompanying drawings, making a part of this specification, in which—

Figure 1:
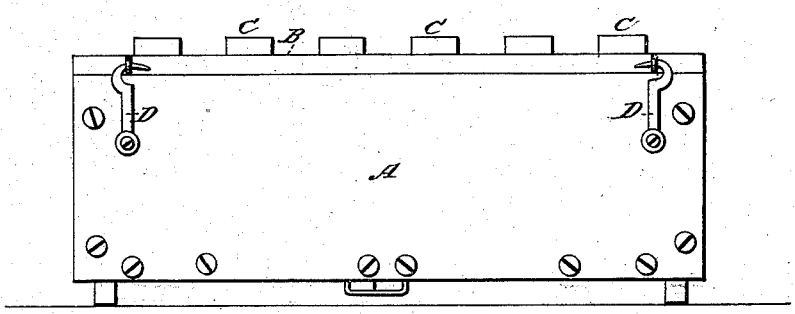
Figure 2:
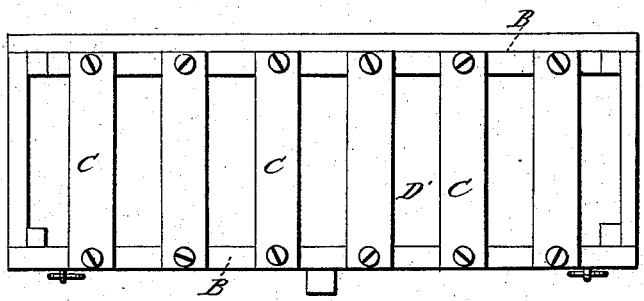
Figure 3:
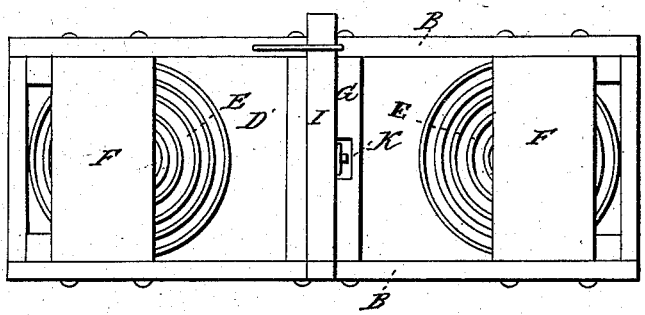

Figure 1 is a side view of the rack.
Figure 2 is a top view.
Figure 3, a view of the bottom.

Like letters of reference refer to like parts in the views.

This rack consists of an oblong square box, A, fig. 1, the length and size of which being more or less according to the number and size of the sheep to be fed and the convenience of handling. B, the top of this box, is a rack, of which B' are the side pieces and C the slats, which are placed far enough apart to allow the sheep to thrust in their noses but not their heads. The rack is hinged to the side of the box, which permits of its being thrown up for the purpose of putting in the hay, and when closed is secured thus by the hook and eye D. D', the bottom of this box or rack, is not fixed, but is loosely fitted to the inside, so as to allow of its being raised upward and downward within by means of the coiled springs E, fig. 3, which, however, may be of any shape applicable, placed under the bottom on cross-pieces F, and to which they are secured. Across the middle of the bottom of the box is a tie, G, fig. 3, through which depends a loop or staple, H. Lying upon this slat is a slide, I, pivoted at the point $x$ to the edge of the box, and the free end of which is held in place by a staple, J. The purpose of this slide is to hold the bottom of the box down, which is done by sliding it so as to cause the pin K to pass through the loop, as shown in fig. 3.

The practical use of this rack or feed-box is as follows: The bottom, being forced down and secured by the slide and pin referred to, the box is then filled with hay. The top or rack being thus let down and fastened by the hooks D, the pin is then drawn out of the loop. The bottom thus liberated is forced upward by the springs, which presses the hay against the under side of the rack within reach of the sheep, and which is constantly being pressed upward as fast as it is eaten away above. By this arrangement the sheep are prevented from thrusting in their heads among the hay, breathing upon it, and pushing it about, whereby much hay is often lost, as it becomes foul and offensive to them. They are also less liable to waste their feed by pulling it out and dropping a part of it under their feet, as they are compelled to feed from the top of the rack, which catches the waste as it falls, and thus it is saved, which is not the case with the ordinary racks, from the side of which the sheep take the hay.

By having the bottom D' made with slats or rails and drawers placed under the rack, which can be easily and readily done, all the seed that may fall from the hay can be saved, and thus add to the economy of feeding.

What I claim as my improvement, and desire to secure by Letters Patent, is—

The combination and arrangement of the box A, rack B, springs E, slide I, adjustable bottom D', and loop or staple H, for the purpose and in the manner herein set forth.

J. C. RAMSEY.

Witnesses:
J. H. BURRIDGE,
J. HOLMES.